United States Patent
Niwa et al.

(10) Patent No.: US 9,254,704 B2
(45) Date of Patent: Feb. 9, 2016

(54) HANDWRITING INPUT APPARATUS, NON-TRANSITORY COMPUTER-READABLE STORAGE MEDIUM AND CONTROL METHOD

(71) Applicant: Konica Minolta, Inc., Tokyo (JP)

(72) Inventors: Takamasa Niwa, Hachioji (JP);
Yasuhiko Yamaguchi, Hino (JP);
Masayuki Inoue, Hino (JP); Kenta Hosaka, Sagamihara (JP); Keiichiro Hyodo, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/294,679

(22) Filed: Jun. 3, 2014

(65) Prior Publication Data
US 2014/0362011 A1    Dec. 11, 2014

(30) Foreign Application Priority Data
Jun. 6, 2013    (JP) .................................. 2013-119420

(51) Int. Cl.
*G06F 3/041*    (2006.01)
*B42F 9/00*    (2006.01)
(Continued)

(52) U.S. Cl.
CPC . *B42F 9/00* (2013.01); *B42F 9/002* (2013.01); *G06F 3/04883* (2013.01); *G06K 9/22* (2013.01)

(58) Field of Classification Search
CPC ............ B42F 9/00; B42F 9/001; B42F 9/002; B42F 9/005; B42F 9/008; B42F 11/00; B42F 11/04; B42F 9/007; G06F 3/041; G06F 3/04883; G06K 9/22; G08C 21/00
USPC .............. 178/18.01–18.11; 382/315; 248/452
See application file for complete search history.

(56) References Cited

U.S. PATENT DOCUMENTS

| 5,629,499 A * | 5/1997 | Flickinger et al. ......... 178/18.01 |
| 6,259,043 B1 * | 7/2001 | Clary et al. ................ 178/18.01 |

(Continued)

FOREIGN PATENT DOCUMENTS

| JP | 2002-009988 A | 1/2002 |
| JP | 2010-271830 | 12/2010 |

(Continued)

OTHER PUBLICATIONS

Office Action dated Jun. 12, 2015 issued from the corresponding Japanese Patent Application No. 2013-119420.

(Continued)

*Primary Examiner* — Kent Chang
*Assistant Examiner* — Mark Edwards
(74) *Attorney, Agent, or Firm* — Lucas & Mercanti, LLP (57) ABSTRACT

Provided are a handwriting input apparatus, a non-transitory computer-readable storage medium and a control method. The handwriting input apparatus includes a touch panel configured to detect pressure acting thereon through a sheet of paper; a holding section for pressing the sheet to hold the sheet onto the touch panel; and a page feed determining section configured to determine whether a page feed action has been performed or not by detecting a state change of the holding section. The handwriting input apparatus further includes a control section configured to, in response to the page feed determining section determining that the page feed action has been performed, conduct at least one of storing information of handwriting input which has been received through the touch panel until the page feed action as handwriting data and transferring the information of the handwriting input as handwriting data to an external device.

21 Claims, 8 Drawing Sheets

(51) Int. Cl.
    *G06K 9/22*     (2006.01)
    *G06F 3/0488*     (2013.01)

(56) References Cited

U.S. PATENT DOCUMENTS

2010/0177063 A1* 7/2010 Altman et al. ................ 345/179
2013/0120302 A1* 5/2013 Kang et al. .................... 345/173

FOREIGN PATENT DOCUMENTS

JP     2012-118849     6/2012
JP     2013-050827     3/2013

OTHER PUBLICATIONS

English translation of Office Action dated Jun. 12, 2015 issued from the corresponding Japanese Patent Application No. 2013-119420.

* cited by examiner

```
qwertyuiop
asdfghjkl
```

FIG. 5B

```
qwertyuiop
asdfghjkl
(0x0C)
```
       PAGE FEED CODE

FIG. 5C

```
<svg width="2000" height="2000" viewBox="0 0 2000 2000"
    xmlns="http://www.w3.org/2000/svg" version="1.2" streamable="true">
<pageSet>

<path d="M 100 100 L 300 100 L 200 300 z" fill="none" stroke="bllack" stroke-width="3" />

</pageSet>
</svg>
```

FIG. 5D

```
<svg width="2000" height="2000" viewBox="0 0 2000 2000"
    xmlns="http://www.w3.org/2000/svg" version="1.2" streamable="true">
<pageSet>

<path d="M 100 100 L 300 100 L 200 300 z" fill="none" stroke="bllack" stroke-width="3" />

</pageSet>
</svg>
```
       INSERTED ELEMENT

HANDWRITING INPUT APPARATUS, NON-TRANSITORY COMPUTER-READABLE STORAGE MEDIUM AND CONTROL METHOD

This application is based on Japanese Patent Application No. 2013-119420 filed on Jun. 6, 2013, in the Japan Patent Office, the entire content of which is hereby incorporated by reference.

TECHNICAL FIELD

The present invention relates to a handwriting input apparatus, a non-transitory computer-readable storage medium storing a control program and a control method. In particular, the present invention relates to a handwriting input apparatus configured to convert information handwritten on a sheet of paper into electronic data, a non-transitory computer-readable storage medium storing a control program to control operations of the handwriting input apparatus, and a control method to control operations of the handwriting input apparatus.

BACKGROUND

In recent years, handwriting input apparatuses have been on sale. Some of the handwriting input apparatuses are provided with a function to store or output information such as characters and figures written on a sheet of paper (hereafter, called as handwriting information) as electronic data (hereafter, called as handwriting data.). Such a handwriting input apparatus includes a pressure sensitive touch panel, and is configured to, when handwriting information is input with a pen on a sheet fixed on the touch panel, detect pressing force of the pen through the touch panel and memorize the moving locus of the touch position as handwriting data.

In such a handwriting input apparatus, it is necessary to store handwriting information written on each of sheets separately from other handwriting information of other sheets. Accordingly, there have been proposed various methods for detecting an action that a user changes a sheet (hereafter, called as a page feed action) by removing or pulling out a sheet having been applied with a handwriting input (a sheet on which a handwriting input has been finished).

For example, Japanese Patent Application Laid-Open Publication (JP-A) No. 2002-009988 discloses a communication system including a first communication apparatus and a second communication apparatus. The first communication apparatus includes a turn-over detecting section configured to detect whether any one sheet in a plurality of stacked sheets has been turned over; a reading section disposed beneath the plurality of stacked sheets so as to read traces of a writing tool on a sheet, of the plurality of stacked sheets; and a transmitting section configured to transmit read-out data read by the reading section to the second communication apparatus. In the first communication apparatus, when the turn-over detecting section detects that the sheet has been turned over, the transmitting section transmits turn-over data indicating that the sheet has been turned over, to the second communication apparatus. The second communication apparatus includes a receiving section configured to receive the read-out data transmitted from the first communication apparatus and to receive the turn-over data; a display section configured to display the traces corresponding to the read-out data received by the receiving section on a screen; and a screen indication changing section configured to change an indication of the screen in accordance with a sheet newly coming to the top of the stacked sheets based on the turn-over data when the receiving section receives the turn-over data. In this JP-A No. 2002-009988, the detecting section detects the ON/OFF state of each of two switches when the page is turned over, to acknowledge taming over of a page, i.e., changing of a sheet.

In the above-mentioned type of handwriting input apparatuses, examples of the methods of detecting a page feed action include a method that a user notifies a page feed operation actively to a handwriting input apparatus by depression of an exclusive button disposed beforehand on the handwriting input apparatus, and a method of disposing a plurality of exclusive sensors to detect a page feed action and detecting a replacement of a sheet based on an output from the exclusive sensors as with JP-A No. 2002-009988.

However, in the former method, there are the following problems. In the case where a user fails to notify a page feed operation to the handwriting input apparatus, the apparatus judges a handwriting input which has been made actuary for a new page as a handwriting input which has been made for the previous page. As a result, the handwriting data is hardly stored as intended by a user. On the other hand, the latter method needs the plurality of exclusive sensors to detect a page feed action, which causes an increase in cost. In addition, the latter method can cause misdetection of the page feed action when the sensor is touched erroneously with a user's hand, which is also a problem. The present invention seeks to solve the problem.

SUMMARY

There are disclosed illustrative hardwiring input apparatuses, non-transitory computer-readable storage media each storing a control program, and control methods.

An illustrative handwriting input apparatus reflecting one aspect of the present invention is a handwriting input apparatus comprising: a touch panel configured to detect pressure acting thereon through a sheet of paper; a holding section for pressing the sheet to hold the sheet onto the touch panel; and a page feed determining section configured to determine whether a page feed action has been performed or not by detecting a state change of the holding section, where the page feed action is an action that a user removes a sheet of paper on which handwriting input has been finished from the touch panel. The handwriting input apparatus furrier comprises a control section configured to, in response to the page feed determining section determining that the page feed action has been performed, conduct at least one of storing information of handwriting input which has been received through the touch panel until the page feed action as handwriting data and transferring the information of the handwriting input as handwriting data to an external device.

An illustrative non-transitory computer-readable storage medium reflecting one aspect of the present invention stores a control program to be executed in a handwriting input apparatus. The handwriting input apparatus comprises a touch panel configured to detect pressure acting thereon through a sheet of paper, and a holding section for pressing the sheet to hold the sheet onto the touch panel. The control program, when being executed by a processor of the handwriting input apparatus, causes the processor to perform the following processes. The processes comprises: determining whether a page feed action has been performed or not by detecting a state change of the holding section, where the page feed action is an action that a user removes a sheet of paper on which handwriting input has been finished from the touch panel; and in response to determining that the page feed action has been performed, conducting page feed processing including at least one of storing information of handwriting input which has been received through the touch panel until the page feed action as handwriting data and transferring the information of the handwriting input as handwriting data to an external device.

An illustrative control method reflecting one aspect of the present invention is a control method of a handwriting input apparatus. The handwriting input apparatus comprises a touch panel configured to detect pressure acting thereon through a sheet of paper and a holding section for pressing the sheet to hold the sheet onto the touch panel. The control method comprises: determining whether a page feed action has been performed or not by detecting a state change of the holding section, where the page feed action is an action that a user removes a sheet of paper on which handwriting input has been finished from the touch panel; and in response to determining that the page feed action has been performed, conducting page feed processing including at least one of storing information of handwriting input which has been received through the touch panel until the page feed action as handwriting data and transferring the information of the handwriting input as handwriting data to an external device.

Other features of illustrative embodiments will be described below.

BRIEF DESCRIPTION OF THE DRAWINGS

Embodiments will now be described, by way of example only, with reference to the accompanying drawings winch are meant to be exemplary not limiting, and wherein like elements numbered alike is several figures, in which.

Each of FIGS. 4A to 4F is a graph illustrating a change of each of various kinds of output values over a period of time in accordance with the state of a holding section of the handwriting input apparatus relating to one embodiment of the present invention.

Each of FIGS. 7A to 7C is a diagram illustrating another specific example of a structure of the holding section of the handwriting input apparatus relating to one embodiment of the present invention.

DETAILED DESCRIPTION

Illustrative embodiments of control apparatuses, non-transitory computer-readable storage media each storing a control program, and control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to handwriting input apparatuses, non-transitory computer-readable storage media each storing a control program and control methods as embodiments of the present invention, it becomes possible to suppress an increase in cost and to detect surely a page feed action.

The reason is that the handwriting input apparatuses can perform the following processing and that the control program can cause the handwriting apparatus to perform the following processing. The handwriting apparatus includes a touch panel and a holding section, such as a clip, provided to hold a sheet on the touch panel. The processing includes determining whether a state change of the holding section has been caused by a page feed action or not by detecting the state of the holding section, and storing and/or outputting information which has been inputted by handwriting through the touch panel until a page feed action is detected in response to determining that the state change of the holding section has been caused by the page feed action.

With this, even though a user fails to notify a page feed operation to the handwriting input apparatus, the handwriting data can be stored and/or output as intended by the user. It can be achieved just by preparing a structure to detect the state of the holding section and there is no need to dispose on the apparatus a plurality of inclusive sensors to detect a page feed action. Accordingly, it becomes possible to suppress an increase in the cost of the handwriting input apparatus. Further, inclusive sensors to detect a page feed action are not arranged onto the handwriting input apparatus, which does not cause erroneous touch of the sensors with a user's hand and can prevent a problem that a page feed action is detected faultily before it happens.

As described in the descriptions about the background, in the case where a handwriting input apparatus equipped with a touch panel is going to store information handwritten on a sheet or sheets as electronic data, the handwriting input apparatus needs to detect that a page has been turned (the sheet has been replaced) in order to make the handwriting information of each page (sheet) distinguishable from that of the other pages. In the case that the handwriting input apparatus employs, as the detecting method, a method that a user notifies a page feed operation actively by depression of an exclusive button, the handwriting input apparatus can store the handwriting date as the content of a previous page if a user fails to notify a page feed operation to the apparatus. Further, in the case that the handwriting input apparatus employs a method of disposing a plurality of exclusive sensors to detect a page feed action and thereby detecting the replacement of a sheet, the disposition of the plurality of exclusive sensors increases the cost. Further, the sensors can be touched erroneously with a user's hand, which causes the handwriting input apparatus to detect a page feed action faultily.

On the other hand, many of handwriting input apparatuses are equipped with a holding section, such as a clip, to hold a sheet or sheets on a touch panel. If a page feed action is performed, the state of the holding section is made to change. A handwriting input apparatus as one embodiment of the present invention, includes a structure configured to perform a control to detect the state of the holding section, determine that the page feed action has been performed if the change in the state of the holding section is defined as a predetermined change, and then, store and/or output (transfer) information of the handwriting input which has been received until the page feed action, as handwriting data. This control uses the existing holding section to acknowledge a page feed action based on the state change of the holding section, which do not only reduce a increase of cost, hut also eliminates botheration to request a user to actively notify a page feed operation and prevents misdetection due to erroneous touch of a user's hand with a sensor before it happens.

EXAMPLE

Figure 1A:
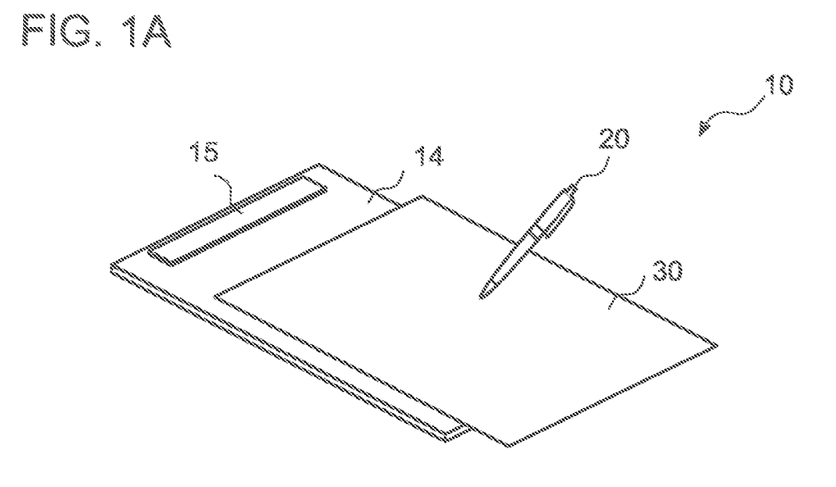
FIGS. 1A and 1B are diagrams illustrating an outer appearance of the constitution of a handwriting input apparatus relating to one embodiment of the present invention.
Figure 1B:
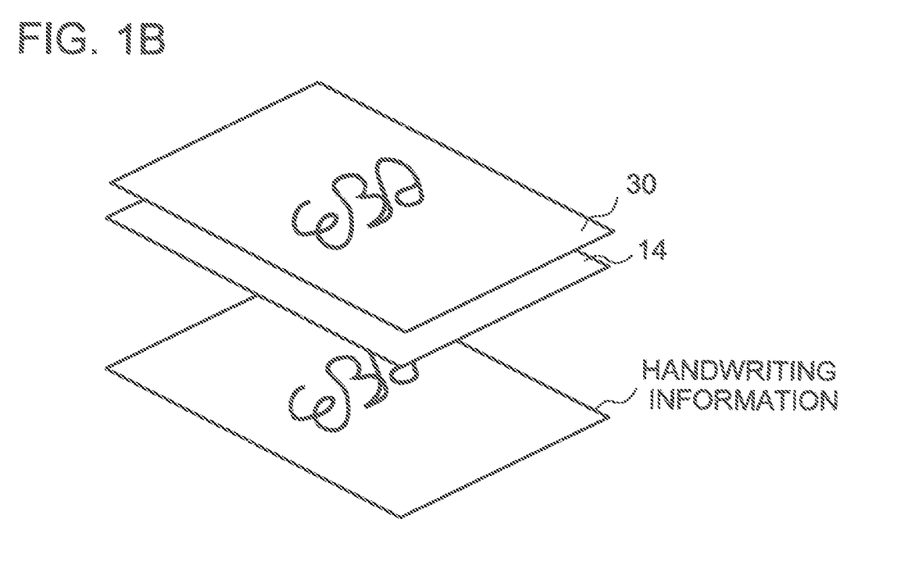
Figure 2:
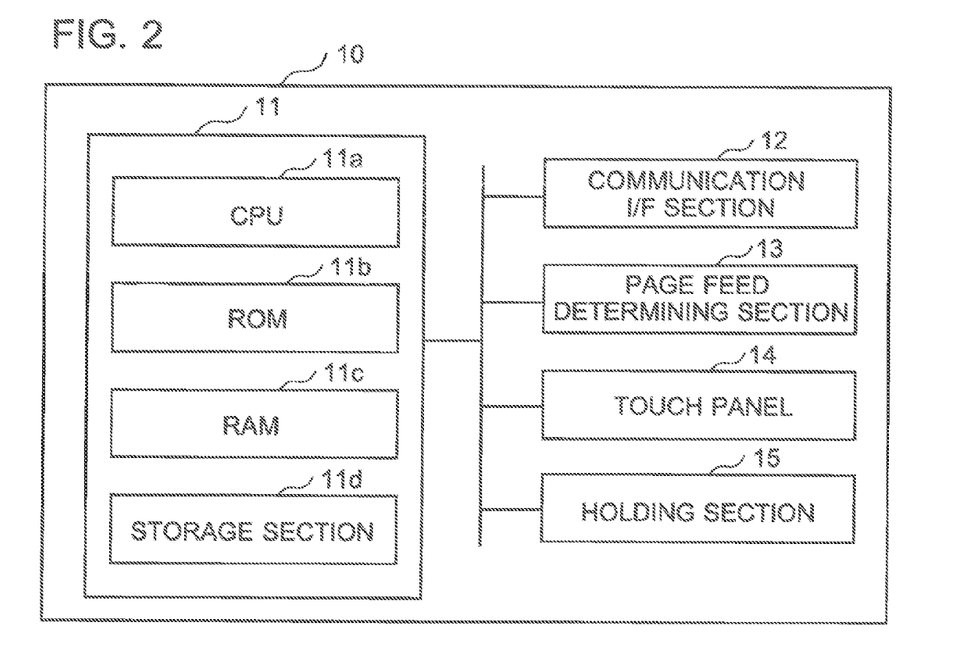
FIG. 2 is a block diagram illustrating the constitution of the handwriting input apparatus relating to one embodiment of the present invention.
Figure 3:
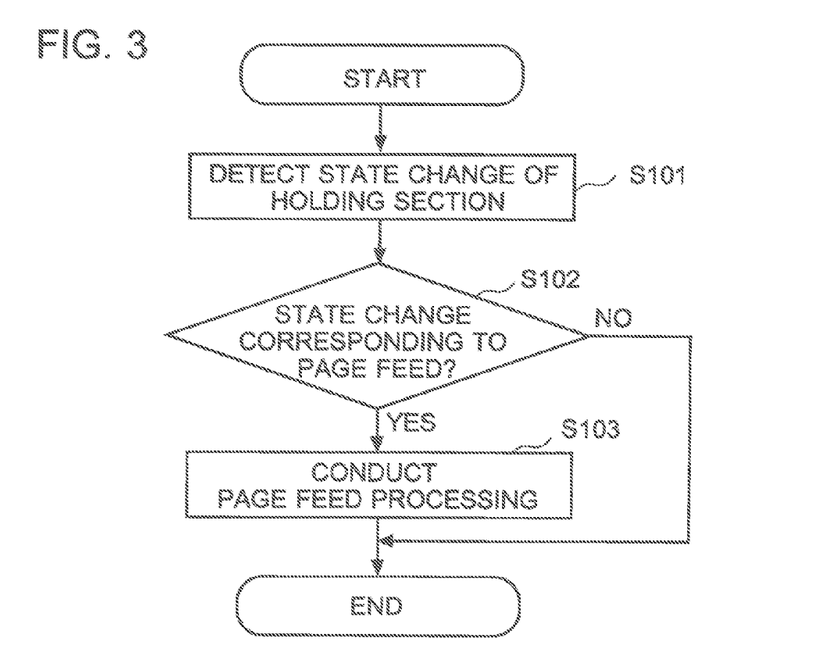
FIG. 3 is a flowchart illustrating processes of the handwriting input apparatus relating to one embodiment of the present invention.
Figure 4A:
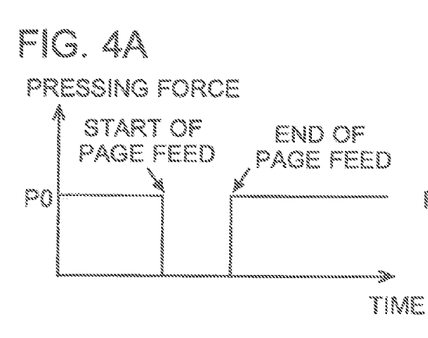
Figure 4B:
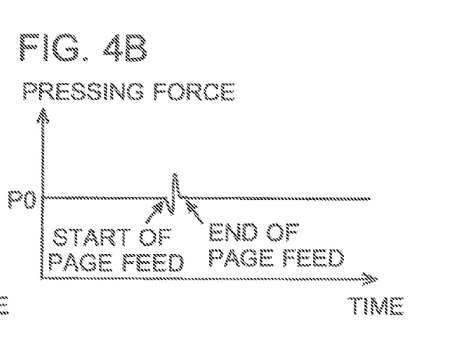
Figure 4C:
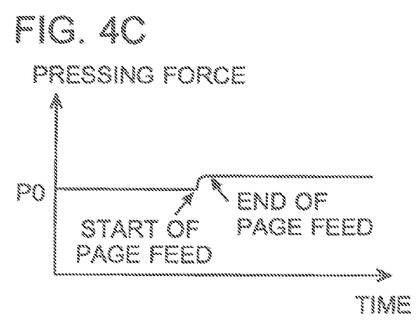
Figure 4D:
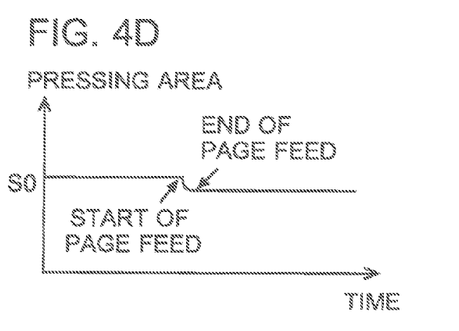
Figure 4E:
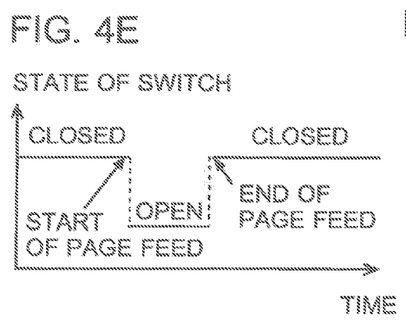
Figure 4F:
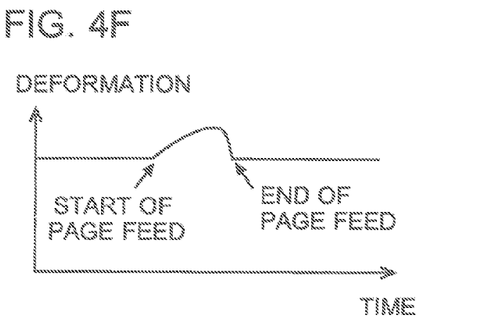
Figures 5A, 5B, 5C:
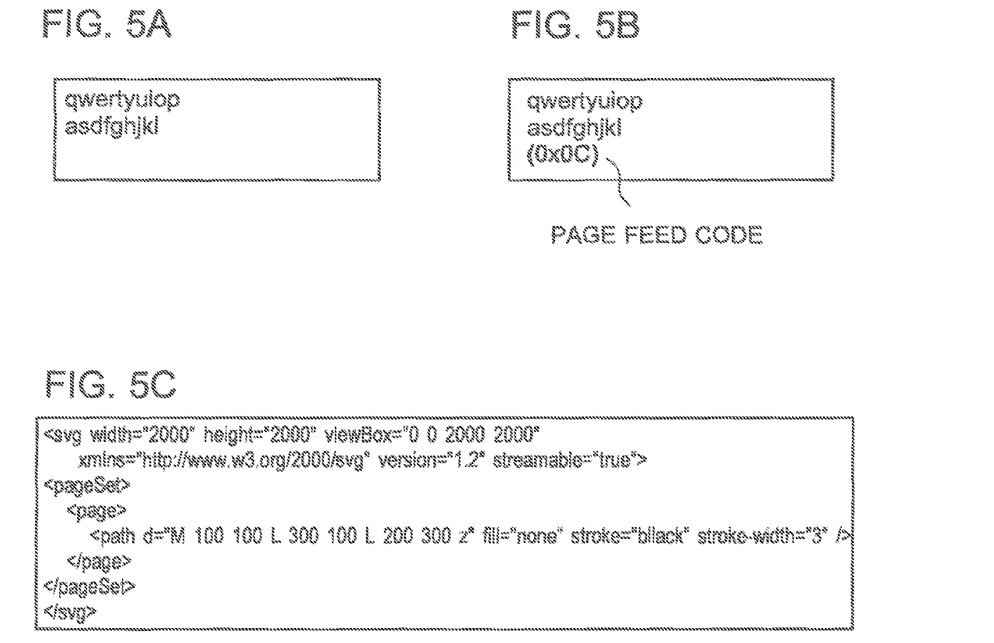
FIGS. 5A to 5F are diagrams illustrating a specific example of a page feed processing of the handwriting input apparatus relating to one embodiment of the present invention.
Figure 5D:
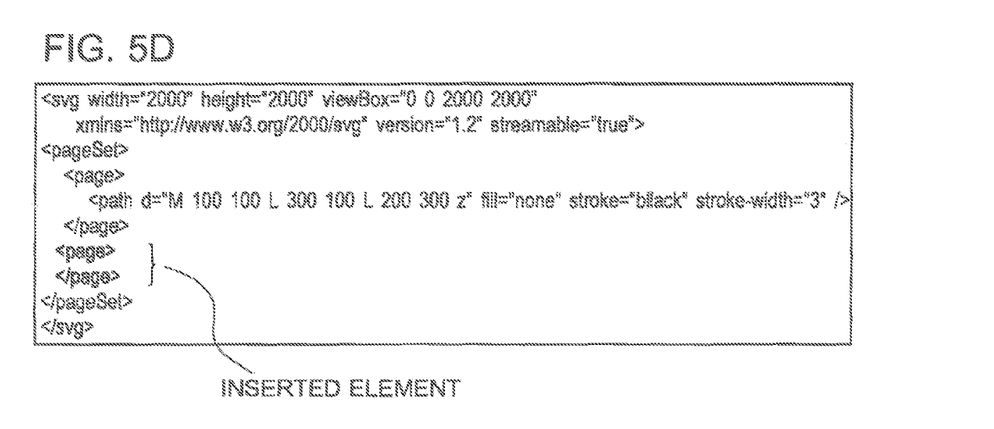
Figure 5E:
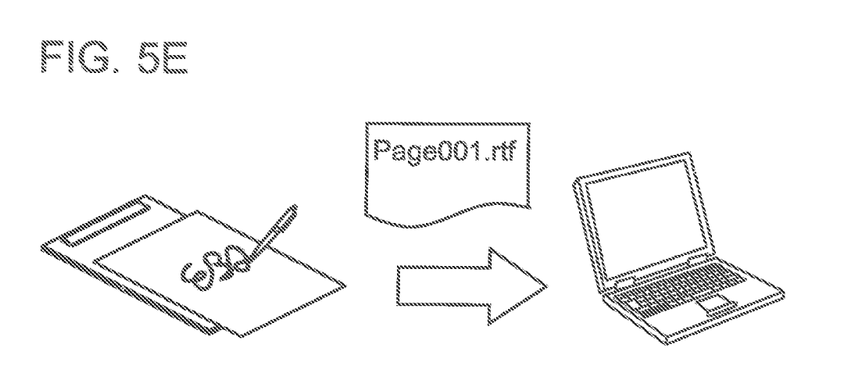
Figure 5F:
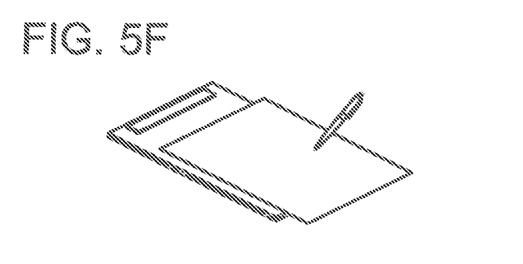
Figure 6A:
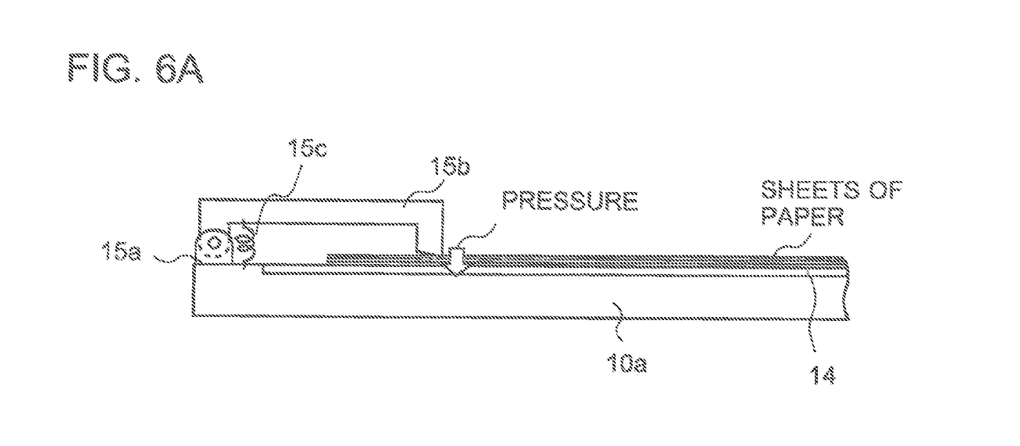
FIGS. 6A to 6C are diagrams illustrating a specific example of a structure the holding section and a method of detecting the state of the holding section in the handwriting input apparatus relating to one embodiment of the present invention.
Figure 6B:
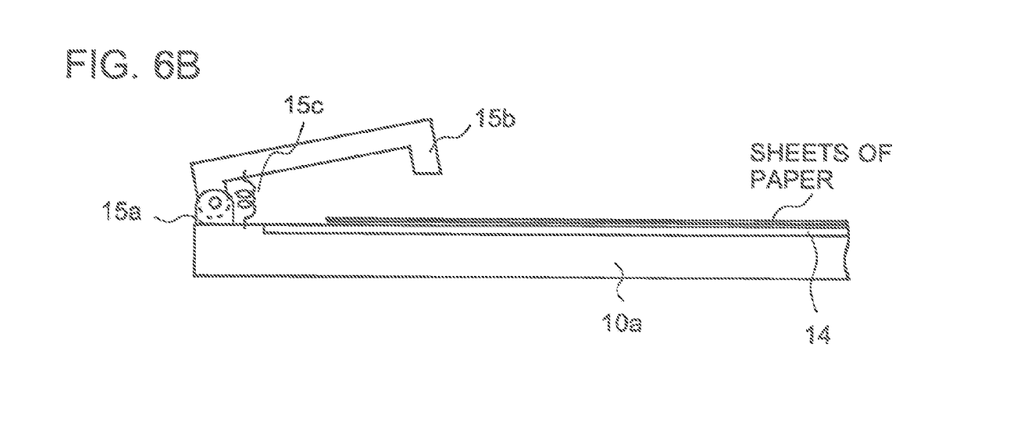
Figure 6C:
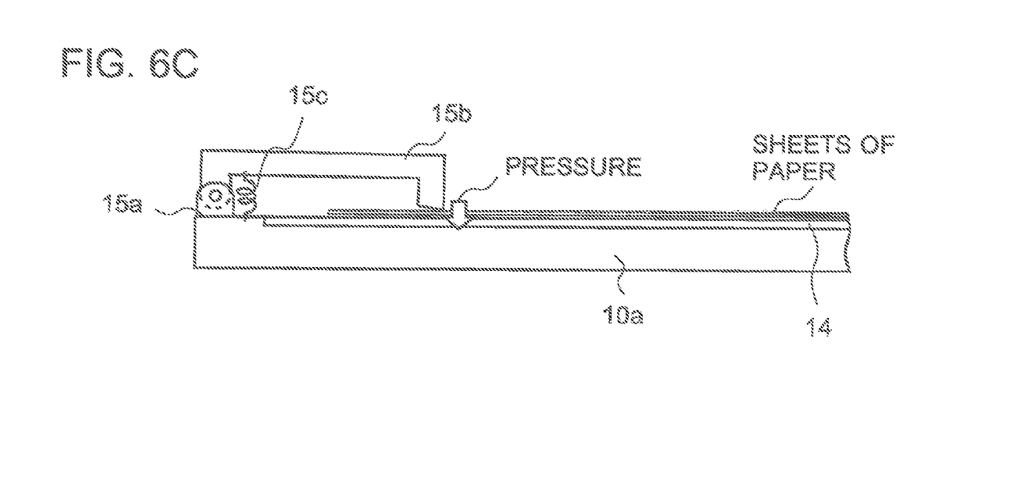
Figure 7A:
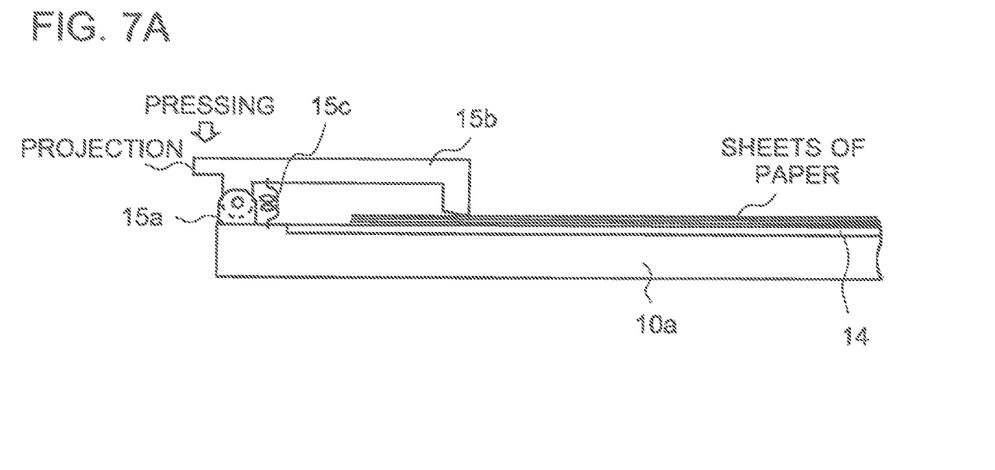
Figure 7B:
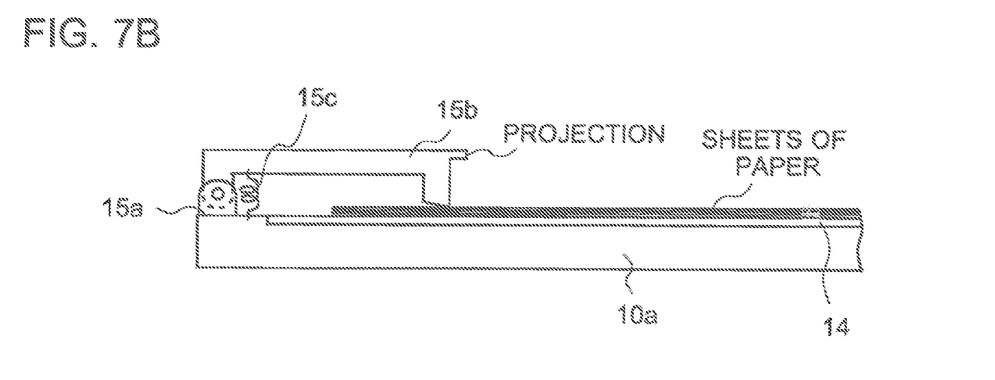
Figure 7C:
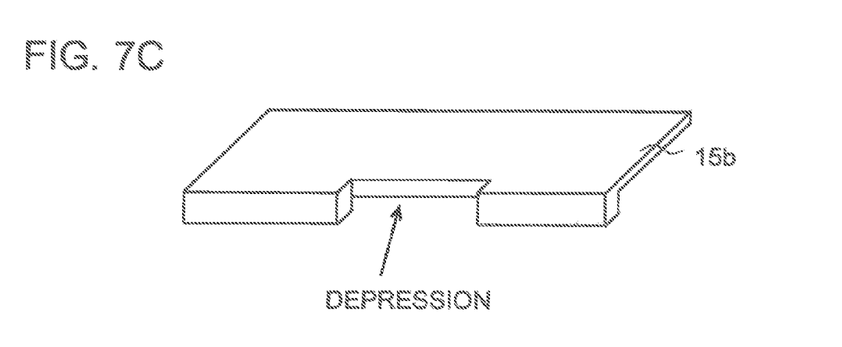
Figure 8:
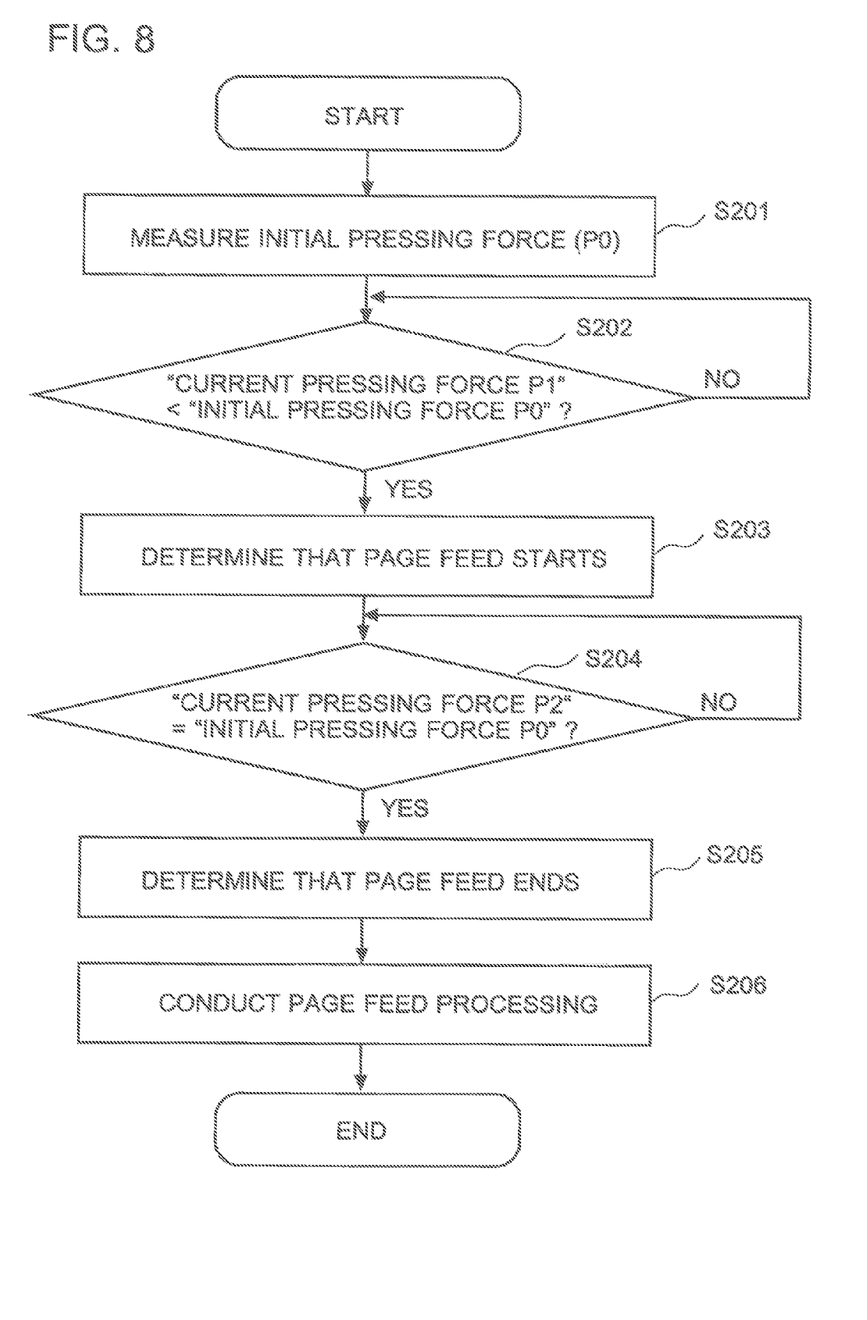
FIG. 8 is a flowchart illustrating a specific example of a page feed determining process of the handwriting input apparatus relating to one embodiment of the present invention.

In order to describe the aforementioned embodiments of the present invention in detail, an example of handwriting input apparatuses, non-transitory computer-readable storage media each storing a control program and control methods will be detailed in the following, referring to FIG. 1A through FIG. 8. FIG. 1A and FIG. 1B are diagrams illustrating an outer appearance of the constitution of a handwriting input apparatus of the present example, and FIG. 2 is a block diagram illustrating the constitution of the handwriting input apparatus. FIG. 3 is a flowchart illustrating processes of the handwriting input apparatus, each of FIGS. 4A to 4F is a graph illustrating a change of each of various kinds of output values over a period of time in accordance with the state of a holding section, and FIGS. 5A to 5F are diagrams illustrating a specific example of a page feed processing of the handwriting input apparatus of the present example. Further, FIGS. 6A to 6C are diagrams illustrating a specific example of a structure of the holding section and a method of detecting the state the holding section, each of FIGS. 7A to 7C is a diagram illustrating another specific example of a structure of the holding section, and FIG. 8 is a flowchart illustrating a specific example of a page feed determining process of the handwriting input apparatus of the present example.

As shown in FIG. 1A, the handwriting input apparatus 10 of the present example includes a pressure sensitive touch panel 14 and a holding section (holder) 15, such as a clip, for holding a sheet or sheets of paper 30 onto the touch panel 14. As shown, in FIG. 1B, the touch panel 14 is configured to detect pressing force of a pen 20 when a user performs a handwriting input with the pen 20 on a sheet or sheets 30 placed on the touch panel 14, and to output handwriting information representing the moving locus of the pressed position by the pen 20 as handwriting data.

As shown in FIG. 2, the handwriting input apparatus 10 includes a control section 11, a communication I/F section 12, a page feed determining section 13, the touch panel 14, the holding section 15, and the like.

The control section 11 includes a CPU (Central Processing Unit) 11a, memories, such as a ROM (Read Only Memory) 11b and a RAM (Random Access Memory) 11c, and a storage section 11d, such as a HDD (Hard Disk Drive), a SSD (Solid State Drive) and a SD (Secure Digital) card. The CPU 11a is configured to develop a program stored in the ROM 11b and the storage section 11d into the RAM 11c and to execute the program, thereby controlling the whole of the handwriting input apparatus 10. Further, the RAM 11c is configured to function additionally as an input buffer to store handwriting information (the coordinates of the moving locus) input by handwriting onto the touch panel 14. The CPU 11a is configured to, is response to the page feed determining section 13 determining such that a page feed action has been performed, read out the handwriting information memorized in the RAM 11c, to conduct at least one of storing the handwriting information as handwriting data of one page into the storage section 11d and outputting (transferring) the handwriting information as handwriting data of one page to an external computing device through the communication I/F section 12, and thereafter, to delete the handwriting information stored in the RAM 11.

The communication I/F section 12 includes an NIC (Network Interface Card), a and the like, and is configured to handle wired or wireless communication with, an external computing device as the transfer destination of the handwriting data in accordance with the standards, such as Ethernet (Registered Trademark), NFC (Near Field Communication), Bluetooth (Registered Trademark) and Transfer Jet (Registered Trademark).

The page feed determining section 13 is configured to detect a state change of the holding section 15, to determine in response to detection of the change whether the change comes from a page feed action or not, and to notify the control section 11 that the page feed action has been performed in response to determining that the change comes from a page feed action. Examples of the method of detecting the state change of the holding section 15 include a method of utilizing a signal output from the touch panel 14 and a method of utilizing a signal output from the holding section 15.

The former method includes a method of determining the state change based on a change of a pressing force or a change of a pressing area both acquired from the touch panel 14. For example, when a user is going to perform a handwriting input onto a next sheet after finishing a handwriting input onto a previous sheet, the user raises the holding section 15 holding the previous sheet (or separates the holding section 15 from the touch panel 14), removes the previous sheet on which the handwriting input has been finished, and then performs an action to lower the holding section 15. Accordingly, by detecting a change of pressing force acting on the touch panel 14 over a period of time during the operations of raising and lowering the holding section 15, the page feed determining section 13 can determine whether a page feed action has been performed. In another case where a user palls out a sheet on which a handwriting input has been finished without raising and lowering the holding section 15, a pressing force acting on the touch panel 14 changes instantaneously at a time of pulling out the sheet. Also in this case, by detecting the change of the pressing force over the period of time, the page feed determining section 13 can determine whether a page feed action has been performed.

In the case where multiple sheets are placed on the touch panel 14, the pressing force applied onto the touch panel 14 by the holding section 15 through the multiple sheets is distributed. Accordingly, the pressing force acting onto the touch panel 14 becomes small and the pressing area becomes large in this case. On the other hand, in the case where one or more sheets have been removed or pulled out from the piled sheets and the number of remaining sheets decreases, the pressing force applied onto the touch panel 14 by the holding section 15 through the remaining sheets concentrates to a certain area of the touch panel 14. Accordingly, the pressing force acting onto the touch panel 14 becomes large and the pressing area becomes small. It means that the page feed determining section 13 can also determine whether a page feed action has been performed, based on detection of a change in the level of the pressing force or the pressing area of the force acting onto the touch panel 14.

The latter method includes a method of determining the state change based on a signal output from a switch or sensor disposed on the holding section 15 beforehand. In one example, a pair of electrodes is arranged separately on a fixed portion and a movable portion of the holding section 15 so as to constitute an electrical switch or an electromagnetic switch such that an electric circuit is tamed on or off by the both electrodes configured to come in contact with or separate from each other in response to an action to raise the holding section 15. In this case, by detecting the open/closed state of the switch, the page feed determining section 13 can determine whether a page feed action has been performed. In another example, at least a part of the holding section 15 is formed with an easily-deformable member and a piezoelectric sensor is disposed on the member, where the piezoelectric sensor is configured to output a signal in response to the deformation of the holding section 15. In the above case, by detecting an amount of the deformation of the holding section 15 based on the signal output from the piezoelectric sensor, the page feed determining section 13 can determine whether a page feed action has been performed.

Here, as dm method of detecting a state change of the holding section 15, the above descriptions exemplify the method of utilizing a signal output from the touch panel 14 and the method of utilizing a signal output from a switch or sensor arranged on the holding section 15. Alternatively, the state change of the holding section 15 may be also detected by a combination of the above methods. For example, the state change of the holding section 15 may be detected by a combination of a change of the pressing force over a period of time at the time of removing a sheet and a change of the level of the pressing force and/or the pressing area before and after removing the sheet. Also, the state change of the holding section 15 may be detected by the open/closed state of a switch disposed on fee holding section 15 or an amount of deformation of the holding section 15, combined with at least one of the change of the pressing force over a period of time at the time of removing a sheet and the change of the level of the pressing force and/or the pressing area before and after removing the sheet. Utilization of two or more pieces of such information together enables to enhance the detection accuracy of the state change of the holding section 15.

The touch panel 14 serves as a digital resistance-film system touch panel in which plural electrodes are arranged in a lattice pattern and which is mounted over a base on which one or more sheets of paper can put. The touch panel 14 is configured to detect a pressing force applied onto the one or more sheets with a pen and to notify the position and the pressure of the touch of the pen to the page feed determining section 13. Here, although the present example employs a digital resistance-film system touch panel 14 configured to detect a pressure, examples of the method of detecting handwriting information should not be limited to the pressure detecting method and an infrared optical imaging method, an ultrasonic wave detecting method, an infrared and ultrasonic wave detecting method, and an electromagnetic inducing method can be employed alternatively.

The holding section 15 is constituted such mat its one end is fixed to a easing of the handwriting input apparatus 10 and the other end is driven (moved) by the elasticity possessed by a spring or the material of the holding section 15 so as to press the touch panel 14. In the case where the page feed determining section 13 is configured to detect the open/closed state of a switch, the fixed portion and the movable portion of the holding section 15 are provided with, respective electrodes. Further, in the case where the page feed determining section 13 is configured to detect an amount of deformation of the holding section 15, at least a part of the holding section 15 is constituted with an easily-deformable member, and a piezoelectric sensor is disposed on the member. In this regard, the holding section 15 should not be limited to the constitution that its one end is secured to the casing of the handwriting input apparatus 10, and the holding section 15 may have an arbitral structure, such as a structure to fix a sheet or sheets by use of a magnet.

FIG. 2 shows one example of the constitution of the handwriting input apparatus 10 of the present example. As long as the handwriting input apparatus 10 can detect a page feed action, its constitution may be changed appropriately. For example, in this example, although the page feed determining section 13 is disposed on the handwriting input apparatus 10, the control section 11 may serve also as the page feed determining section 13 as smother example. Namely, a program (control program) executed on the control section 11 may cause the control section 11 to perform the processing of the page feed determining section 13.

Hereafter, the processing of the handwriting input apparatus 10 with the above-mentioned constitution will be described. The CPU 11a develops a control programs memorized in the ROM 11b and the storage section 11d to the RAM 11c and executes the control program, thereby performing the processing shown in the flowchart diagram in FIG. 3.

First, the page feed determining section 13 of the handwriting input apparatus 10 (provided by execution of the control program) detects a state change of the holding section 15 (S101). For example, as mentioned above, the page feed determining section 13 detects a change in a pressing force or a pressing area acting onto the touch panel 14 applied by the holding section 15, based on signals output from the touch panel 14. Based on the change, the page feed determining section 13 determines whether the state of the holding section 15 has changed or not.

Successively, upon detection of the state change of the holding section 15, the page feed determining section 13 (provided by execution of the control program) determines whether the state change of the holding section 15 is a state change corresponding to a page feed operation (that is, a state change coming from a page feed action) (S102). The way to determine the state change will be described with reference to FIGS. 4A to 4F each illustrating a change in the output value of the touch panel 14 or the holding section 15 over a period of time.

For example, if the case where a user removes a sheet, on which a handwriting input has been finished, by raising the holding section 15 is supposed, a pressing force acting on a specific portion (portion at which the holding section 15 presses with its tip) of the touch panel 14 becomes small while the holding section 15 is being raised up. Accordingly, the page feed determining section 13 can determine that the state change corresponding to the page feed operation has been occurred when the pressing force acting on the specific portion of the touch panel 14 changes so as to once become almost zero (0) from a value in an initial state ("P0" in FIG. 4A) and then return again to the initial value, as shown in FIG. 4A.

Further, if the case where a user pulls out a sheet, on which a handwriting input has been finished, without raising the holding section 15 is supposed, a pull of the sheet on which a handwriting input has been finished makes a certain amount of a force acting upward onto the holding section 15, and then the holding section 15 moves downward by the action of the spring after the sheet has been, palled out. Accordingly, the pressing force acting onto the specific portion of the touch panel 14 fluctuates momentarily. Therefore, the page feed determining section 13 can determine that the state change corresponding to the page feed operation has been occurred when the pressing force acting onto the specific portion of the touch panel 14 changes so as to become temporarily small, then become large, and thereafter return to the initial value ("P0") as shown in FIG. 4B.

Furthermore, if the case where a user pulls out a sheet, on which a handwriting input has been finished, from a plurality of sheets without raising the holding section 15 is supposed, the pressing force of the holding section 15 is made to concentrate to a specific portion of the touch panel 14 because of a reduction of the number of sheets. Accordingly, the level of the pressing force acting onto at the specific portion of the touch panel 14 or the pressing area fluctuates. Therefore, the page feed determining section 13 can determine that the state change corresponding to the page feed operation has been occurred when the pressing force acting onto the specific portion of the touch panel 14 changes so as to become larger than the initial level "P0" as shown in FIG. 4C (or the pressing area of the specific portion of the touch panel 14 changes so as to become smaller than the initial level "S0" as shown in FIG. 4D) before and after the pull out of the sheet.

Furthermore, in the case where a user removes a sheet, on which a handwriting input has been finished, by raising the holding section 15 under the condition that a switch is disposed on the movable portion of the holding section 15 is supposed, the open/closed state of the switch changes corresponding to the raising of the holding section 15. Accordingly, the page feed determining section 13 can determine that the state change corresponding to the page feed operation has been occurred when the switch changes once from the closed (or open) state to the open (or closed) state and then returns again to the closed (or open) state, as shown in FIG. 4E.

Moreover, in the case where a user removes a sheet, on which a handwriting input has been finished, by raising the holding section 15 under the condition that a piezoelectric sensor is disposed on the surface of the holding section 15 is supposed, the holding section 15 deforms by being raised up, whereby the output value (an amount of deformation) of the piezoelectric sensor changes. Accordingly, the page feed determining section 13 can determine that the state change corresponding to the page feed operation has been occurred when the amount of deformation of the holding section 15 detected by the piezoelectric sensor changes so as to become once large and then to return to the original state, as shown in FIG. 4F.

Incidentally, the reason why the above determining processing is performed is as follows. The reason is to prevent a state change of the holding section 15 caused by actions other than a page feed action, for example, art action that a user erroneously touches the holding section 15 or pulls a sheet, from being erroneously determined as a state change corresponding to a page feed operation.

Subsequently in the flow, when the page feed determining section 13 determined that the change is a state change corresponding to a page feed operation, the control section 11 conducts page feed processing (S103). FIGS. 5A to 5F illustrate a specific example of the page feed processing. First, the control section 11 adds a page feed code to the handwriting information which has been output from the touch panel 14 until the state of the holding section 15 changes. For example, on the supposition that the handwriting information output from the touch panel 14 is "qwertyuiopasdfghjkl" as shown in FIG. 5A, the control section 11 inserts a page feed code (a character string written with thick letters), such as "0x0C", of ASCII at the tail end of the handwriting information as shown in FIG. 5B.

Next, the control section 11 creates a file (handwriting data) including descriptions of the handwriting information. In concrete terms, the control section 11 creates a new file (here "Page001.rft") and describes the handwriting information up to "0x0C" in the file so as to be displayed on a computing device, as shown in FIG. 5C. The control section 11 further inserts in the file descriptions of a logic structure representing a page, such as an element of "<Fixed Page>" for XPS (XML Paper Specification) and an element of "" for SVG (Scalable Vector Graphics) Print. Each of FIGS. 5C and 5D illustrates descriptions of the file in a case of SVG Print, in which elements of "" and "" (character strings written with thick characters in FIG. 5D) are inserted to the descriptions of the file "Page001.rft" illustrated in FIG. 5C.

Next, the control section 11 transfers the created file. In concrete terms, the control section 11 transfers the created file to a computing device connected via the communication I/F section 12, as shown in FIG. 5E, and makes the handwriting input apparatus itself is a state that the apparatus can receive a new handwriting input thereon, as shown in FIG. 5F.

In the processing illustrated is FIGS. 5A to 5F, each time when a page feed action has been performed, the control section 11 created a file including descriptions of the handwriting information which has been received until the page feed action, and transferred the crested file to an external device such as a competing device. However, the control section 11 may perform the following processing alternatively. That is, the control section 11 adds a page feed code to the handwriting information and once stores the handwriting information to a storage such as storage section 11d, each time when a page feed action, has been performed. Then, in response to receiving transfer instructions given by a user, the control section 11 creates, based on one or plural pieces of the handwriting information each of which a page feed code was added to, plural files each independent for each page or a file including descriptions by which respective pages can be recognized. The control section 11 further transfers the created files or file to the external device such as the computing device.

Hereafter, description is given to a detection processing in a specific example in which, in the case where a user raises the holding section 15 at the time of a page feed operation, the page feed determining section 13 (provided by execution of the control program) detects a page feed action based on a pressing force acting onto the touch panel 14 applied by the holding section 15.

Each of FIGS. 6A to 6C is a cross sectional view showing schematically the structure of the holding section 15 in this example. The holding section 15 includes a fixed portion. 15a fixed to a casing 10a of the handwriting input apparatus 10, a movable portion 15b to be driven (to move) relative to the fixed portion 15a, and an elastic portion 15c, such as a spring, connecting the fixed portion 15a and the movable portion 15b together such that a tip of the movable portion 15b may press the touch panel 14 through a sheet or sheets of paper 30.

In the state of receiving a handwriting input, as shown in FIG. 6A, at least one point of the tip of the movable portion 15b is made to press the touch panel 14 by the elastic section 15c. Further, in the state of removing a sheet on which the handwriting input has been finished, as shown, in FIG. 6B, the movable portion 15b is raised which makes the pressing force acting onto the touch panel 14 zero. Subsequently, in the state after the sheet has been removed, as shows in FIG. 6C, at least one point of the tip of the movable portion 15b is made to press the touch panel 14 by the elastic section 15c. Accordingly, by detecting a change of the output signal of the touch panel 14 at a portion corresponding to the tip of the movable section 15b, the page feed determining section 13 can determine whether a page feed action has been performed or not.

In the case of raising the movable portion 15*b*, a user can pick up the opposing sides (the side close to the face and the rear of the sheet of each of FIGS. 6A to 6C) of the tip of the movable portion 15*b* to raise the movable portion 15*b*. Alternatively, there may be provided an additional structure on holding section 15 to allow a user to raise the movable portion 15*b* easily. For example, as illustrated in FIG. 7A, a projection may be formed on the movable portion 15*b* such that the movable portion 15*b* extends toward the fixed portion 15*a* side so as to allow a user to push down the projection to raise the movable portion 15*b*. Further, as shown in FIG. 7B, a projection may be formed on a certain position around the tip of the movable portion 15*b* so as to allow a user to pick up the projection with the user's finger to raise the movable portion 15*b*. Furthermore, as shown In FIG. 7C, a depression may be formed at the tip of the movable portion 15*b* so as to allow a user to fit the user's finger with the depression to raise the movable portion 15*b*.

Next, description is given to a method of detecting a page feed action by using the holding section 15 with the above-mentioned structure. The CPU 11*a* develops a control, programs memorized in the ROM 11*b* and the storage section 11*d* to the RAM 11*c* and executes the control program, thereby performing the processing shown in the flowchart diagram in FIG. 8.

First, at the time the power source of the apparatus has been turned on, or at the time a start, switch of a handwriting input has been depressed, the page feed, determining section 13 (provided by execution of the control program) measures a pressing force P0 at an initial state (the initial value of the pressing force) of the holding section 15 pressing the touch panel 14 (S201), and stores the measured pressing force P0 at the initial state to the RAM 11*c* or the storage section 11*d*. Here, the pressing force P0 at the initial state may change corresponding to the variation (deterioration) of the elastic section 15*c* with the passage of time and/or to the number of sheets. Accordingly the initial value of the pressing force is preferably measured each time the power source is turned on or each time the start switch of a handwriting input is depressed. By measuring it for each time, the page feed action can be detected accurately.

Next, the page feed determining section 13 (provided by execution of the control program) measures a current pressing force P1 applied onto the touch panel 14 with the holding section 15, and then determines whether the current pressing force P1 is smaller than the pressing force P0 in the initial state stored in the RAM 11*c* or the storage section 11*d* (S202). When the current pressing force P1 is smaller than the initial pressing force P0, as shown in the above-mentioned FIG. 4A and FIG. 4B, the page feed determining section 13 determines such that a page feed operation has been started (S203). In the case where the holding section 15 is raised, the pressing force P1 becomes zero. In the case where a sheet is pulled out, the pressing force P1 becomes smaller than the initial pressing force P0 because of an upward component of the pulling force.

Next, the page feed determining section 13 (provided by execution of the control program) measures a current pressing force P2 with, which the holding section 15 currently presses the touch panel 14, and then determines whether the current pressing force P2 is almost equal to the pressing force P0 in the initial state stored in the RAM 11*c* or the storage section 11*d* (S204). When the current pressing force P2 is almost equal to the initial pressing force P0, as shown in the above-mentioned FIG. 4A and FIG. 4B, the page feed determining section 13 determines such that page feed operation has been finished (S205). Successively, the control section 11 conducts foe above-mentioned page feed processing (S206).

In the case where a depression is formed at the tip of the movable portion 15*b*, and thereby, the touch panel 14 is pressed with multiple positions of the tip through a sheet or sheets 30, the following processing is preferably performed. That is, the processes of from S201 to S205 are performed for each of the multiple positions, and the page feed determining section 13 determines that a page feed action has been performed when the current pressing force has changed to P1 (P1<P0) and then to P2 (P2=P0) at each of the multiple positions.

In this way, the handwriting input apparatus 10 of the present example, has a structure configured to determine whether a page feed action has been performed or sot, based on a pressing force or a pressing area detected by a touch panel 14. Accordingly, there is no need to provide a plurality of sensors for exclusive use in order to detect a page feed action as with conventional technologies, which suppresses an increase of the cost and prevents misdetection of a page feed action due to the touch with the sensors before it happens. Further, even in the case where the page feed determining section 13 determines whether a page feed action has been performed or not based on the output of a detecting member, such as a switch and a sensor, arranged on the holding section, an increase of the cost can be suppressed in comparison with conventional techniques because this detecting member has a simple structure. In addition, this detecting member is disposed at a position distant from a handwriting input region of the handwriting input apparatus, which can prevent misdetection of a page feed action due to erroneous touch with the detecting member.

Here, the present invention should not be limited to the above-mentioned embodiments and examples, and the constitution and the control method of the handwriting input apparatus 10 may be modified appropriately unless the modification deviates from the intention of the present invention.

For example, in the above-mentioned example, the movable portion 15*b* of the holding section 15 is structured to be driven (moved) toward the touch-panel 14 side by using the elastic portion 15*c*. However, the whole of the holding section 15 may be formed with an elastically-deformable member.

Further, in the above-mentioned example, the holding section 15 is structured to hold a sheet or sheets 30 with a single body. Alternatively, two or more holding sections 15 may be provided to hold a sheet or sheets 30 (for example, to hold the sheet or sheets 30 at the left-hand side position and the right-hand side position).

Furthermore, in the above-mentioned example, the touch panel 14 is configured to only receive user's operations. Alternatively, the touch panel 14 may be constituted to be in one body with a display such as a LCD (Liquid Crystal Display) so as to receive user's operations and display information thereon.

The invention claimed is:
1. A handwriting input apparatus comprising:
a touch panel configured to detect pressure acting thereon through a sheet of paper;
a holding section for pressing the sheet to hold the sheet onto the touch panel by applying a pressing force in a pressed area on the touch panel;
a page feed determining section configured to determine whether a page feed action has been performed or not by detecting a state change of the holding section, the page feed action being an action that a user removes a sheet of paper on which handwriting input has been finished from the touch panel; and a control section configured to, in response to the page feed determining section determining that the page feed action has been performed, conduct at least one of storing information of handwriting input which has been received through the touch panel until the page feed action, as handwriting data and transferring the information of the handwriting input as handwriting data to an external device, wherein the page feed determining section is configured to determine whether the page feed action has been performed or not based on a change in at least one of the pressing force and the pressed area between a first pressing force applied to the touch panel when the holding section presses a first sheet of paper onto the touch panel and a second pressing force applied to the touch panel when the holding section presses the touch panel without the first sheet of paper.

2. The handwriting input apparatus of claim 1, wherein the page feed determining section is configured to, on the holding section pressing a plurality of positions on the touch panel, determine whether the page feed action has been performed or not based on the change in pressing force at each of the plurality of positions.

3. The handwriting input apparatus of claim 1, wherein the page feed determining section is configured to determine whether the page feed action has been performed or not in response to detecting that the pressing force becomes smaller than an initial value of the pressing force and then returns to the initial value.

4. The handwriting input apparatus of claim 3, further comprising a storage section, wherein the page feed determining section is configured to measure the initial value of the pressing force and store the initial value to the storage section, each time a power source of the handwriting input apparatus is turned on.

5. The handwriting input apparatus of claim 1, further comprising a detecting member arranged on the holding section, wherein the page feed determining section is configured to determine whether the page feed action has been performed or not based on the change in the at least one of the pressing force and the pressed area between the first pressing force and the second pressing force and a change in an output value of the detecting member.

6. The handwriting input apparatus of claim 1, wherein the control section is configured to add a predetermined page feed code to the information of handwriting input which has been received through the touch panel until the page feed action, create handwriting data including descriptions of one or more pages each including the information of the handwriting input, and an element representing a page to the handwriting data, and conduct at least one of storing the handwriting data with the element being added and transferring the handwriting data with the element being added to the external device.

7. A non-transitory computer-readable storage medium storing a control program, to be executed in a handwriting input apparatus comprising a touch panel configured to detect pressure acting thereon through a sheet of paper, and a holding section for pressing the sheet to hold the sheet onto the touch panel by applying a pressing force in the pressed area on the touch panel, the control program, when being executed by a processor of the handwriting input apparatus, causing the processor to perform processes comprising:

determining whether a page feed action has been performed, or not by detecting a state change of the holding section, the page feed action being an action that a user removes a sheet of paper on which handwriting input has been finished from the touch panel; and in response to determining that the page feed action has been performed, conducting page feed processing including at least one of storing information of handwriting input which has been received through the touch panel until the page feed action, as handwriting data and transferring the information of the handwriting input as handwriting data to an external device, wherein the step of determining includes determining whether the page feed action has been performed or not based on a change in at least one of the pressing force and the pressed area between a first pressing force applied to the touch panel when the holding section presses a first sheet of paper onto the touch panel and a second pressing force applied to the touch panel when the holding section presses the touch panel without the first sheet of paper.

8. The non-transitory computer-readable storage medium of claim 7, wherein the determining whether the page feed action has been performed or not, includes, on the holding section pressing a plurality of positions on the touch panel, determining whether the page feed action has been performed, or not based on the change in pressing force at each of the plurality of positions.

9. The non-transitory computer-readable storage medium of claim 7, wherein the determining whether the page feed action has been performed or not, includes determining whether the page feed action has been performed or not in response to detecting that the pressing force becomes smaller than an initial value of the pressing force and then returns to the initial value.

10. The non-transitory computer-readable storage medium of claim 9, wherein the determining whether the page feed action has been performed or not, includes measuring the initial value of the pressing force and storing the initial value to a storage section of the handwriting input apparatus, each time a power source of the handwriting input apparatus is turned on.

11. The non-transitory computer-readable storage medium of claim 7, wherein the determining whether the page feed action has been performed or not, includes determining whether the page feed action has been performed or not based on the change in the at least one of the pressing force and the pressed area between the first pressing force and the second pressing force and a change in an output value of a detecting member arranged on the holding section.

12. The non-transitory computer-readable storage medium of claim 7, wherein the conducting the page feed processing includes adding a predetermined page feed code to the information of handwriting input which has been received through the touch panel until the page feed action, creating handwriting data including descriptions of one or more pages each including the information of the handwriting input, adding an element representing a page to the handwriting data, and conducting at least one of storing the handwriting data and transferring the handwriting data to the external device, after adding the element representing a page to the handwriting data.

13. A control method of a handwriting input apparatus comprising a touch panel configured to detect pressure acting thereon through a sheet of paper and a holding section for pressing the sheet to hold the sheet onto the touch panel by applying a pressing force in a pressed area on the touch panel, the control method comprising:
- determining whether a page feed action has been performed or not by detecting a state change of the holding section, the page feed action being an action that a user removes a sheet of paper on which handwriting input has been finished from the touch panel; and
- in response to determining that the page feed action has been performed, conducting page feed processing including at least one of
- storing information of handwriting input which has been received through the touch panel until the page feed action as handwriting data and
- transferring the information of the handwriting input as handwriting data to an external device,
- wherein the step of determining includes determining whether the page feed action has been performed or not based on a change in at least one of the pressing force and the pressed area between a first pressing force applied to the touch panel when the holding section presses a first sheet of paper onto the touch panel and a second pressing force applied to the touch panel when the holding section presses the touch panel without the first sheet of paper.

14. The control method of claim 13,
wherein the determining whether the page feed action has been performed or not, includes, on the holding section pressing a plurality of positions on the touch panel, determining whether the page feed action has been performed or not based on the change in pressing force at each of the plurality of positions.

15. The control method of claim 13,
wherein the determining whether the page feed action has been performed or not, includes determining whether the page feed action has been performed or not in response to detecting that the pressing force becomes smaller than as initial value of the pressing force and then returns to the initial value.

16. The control method of claim 15,
wherein the determining whether the page feed action has been performed or not, includes measuring the Initial value of the pressing force and storing the initial value to a storage section of the handwriting input apparatus, each time a power source of the handwriting input apparatus is turned on.

17. The control method of claim 13,
wherein the determining whether the page feed action has been performed or not, includes determining whether the page feed action has been performed or not based on the change in the at least one of the pressing force and the pressed area between the first pressing force and the second pressing force and a change in an output value of a detecting member arranged on the holding section.

18. The control method of claim 13,
wherein the conducting the page feed processing includes
- adding a predetermined page feed, code to the information of handwriting input which has been received through the touch panel until the page feed action,
- creating handwriting data including descriptions of one or more pages each including the information of the handwriting input,
- adding an element representing a page to the handwriting data, and
- conducting at least one of storing the handwriting data and transferring the handwriting data to the external device, after adding the element representing a page to the handwriting data.

19. The handwriting input apparatus of claim 1, wherein the page feed determining section determines whether the page feed action has been performed or not based on the change in the at least one of the pressing force and the pressed area between the first pressing force and the second pressing force and a change of the pressing force over a period of time at the time of removing the sheet.

20. The non-transitory computer-readable storage medium of claim 7, wherein the step of determining includes determining whether the page feed action has been performed or not based on the change in the at least one of the pressing force and the pressed area between the first pressing force and the second pressing force and a change of the pressing force over a period of time at the time of removing the sheet.

21. The control method of claim 13, wherein the page feed determining section determines whether the page feed action has been performed or not based on the change in the at least one of the pressing force and the pressed area between the first pressing force and the second pressing force and a change of the pressing force over a period of time at the time of removing the sheet.

* * * * *